US 11,080,284 B2

(12) United States Patent
Neagovici-Negoescu et al.

(10) Patent No.: US 11,080,284 B2
(45) Date of Patent: Aug. 3, 2021

(54) HYBRID SEARCH CONNECTOR

(71) Applicant: Microsoft Technology Licensing, LLC, Redmond, WA (US)

(72) Inventors: Mircea Neagovici-Negoescu, Bellevue, WA (US); Roberta Cannerozzi, Bellevue, WA (US); Vladimir Gvozdev, Redmond, WA (US); Kathrine Hammervold, Oslo (NO); Kjetil Krogvig Bergstrand, Kolbotn (NO); Anund Lie, Oslo (NO); Liang Zheng, Oslo (NO); Lars Kirkholt Melhus, Oslo (NO); Jørgen Løland, Trondheim (NO); Niels Petter Rasch-Olsen, Heggedal (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 549 days.

(21) Appl. No.: 14/854,670

(22) Filed: Sep. 15, 2015

(65) Prior Publication Data
US 2016/0321264 A1 Nov. 3, 2016

Related U.S. Application Data

(60) Provisional application No. 62/155,749, filed on May 1, 2015.

(51) Int. Cl.
*G06F 16/2457* (2019.01)
*G06F 21/62* (2013.01)
(Continued)

(52) U.S. Cl.
CPC .... *G06F 16/24578* (2019.01); *G06F 16/2228* (2019.01); *G06F 16/93* (2019.01);
(Continued)

(58) Field of Classification Search
CPC .......... G06F 17/3053; G06F 17/30011; G06F 17/2705; G06F 17/30321; G06F 17/30893; G06F 21/6218; H04L 67/42
(Continued)

(56) References Cited

U.S. PATENT DOCUMENTS 8,817,777 B2    8/2014 Manian et al.
8,849,761 B2 *  9/2014 Prahlad .................. G06F 16/41
                                                        707/640
(Continued)

FOREIGN PATENT DOCUMENTS

IN    1765/CHE/2015    *   4/2015   ......... H04L 67/1097

OTHER PUBLICATIONS

"Hybrid Search: Configure Outbound Hybrid Search in SharePoint Online with Password Sync", Published on: Aug. 13, 2014 Available at: video.ch9.ms/sessions/spc/2014/SPC320_Hodgkinson.pptx.
(Continued)

*Primary Examiner* — Ashish Thomas
*Assistant Examiner* — Abdullah A Daud
(74) *Attorney, Agent, or Firm* — Christopher J. Volkmann; Kelly, Holt & Christenson, PLLC

(57) ABSTRACT

Documents in a local computing system are parsed for indexing and sent to a cloud-based computing system. The cloud-based search service indexes documents that are parsed on the local computing system, as well as documents that reside in the cloud-based computing system. When a user launches a search, the search is executed against a single search index in the cloud-based computing system, which includes an index of content sources from both the local computing system and the cloud-based computing system.

20 Claims, 10 Drawing Sheets

(51) Int. Cl.
*G06F 16/93* (2019.01)
*G06F 16/22* (2019.01)
*G06F 40/205* (2020.01)
*H04L 29/06* (2006.01)
*G06F 16/958* (2019.01)

(52) U.S. Cl.
CPC ........ *G06F 16/972* (2019.01); *G06F 21/6218* (2013.01); *G06F 40/205* (2020.01); *H04L 67/42* (2013.01)

(58) Field of Classification Search
USPC .......................................................... 707/728
See application file for complete search history.

(56) References Cited

U.S. PATENT DOCUMENTS

| | | | |
|---|---|---|---|
| 9,785,798 B1* | 10/2017 | Enderwick | G06F 21/6263 |
| 9,886,446 B1* | 2/2018 | Liu | G06F 16/22 |
| 2003/0144996 A1* | 7/2003 | Moore, Jr. | G06F 16/951 |
| 2005/0060286 A1* | 3/2005 | Hansen | G06F 16/951 |
| 2006/0136378 A1* | 6/2006 | Martin | G06F 16/9535 |
| 2008/0071805 A1* | 3/2008 | Mourra | G06F 16/93 |
| 2011/0093471 A1* | 4/2011 | Brockway | G06F 16/313 707/747 |
| 2011/0208710 A1 | 8/2011 | Lesavich | |
| 2012/0109933 A1 | 5/2012 | Kravets | |
| 2012/0130991 A1 | 5/2012 | Atas et al. | |
| 2012/0304233 A1* | 11/2012 | Roberts | H04N 21/23113 725/82 |
| 2012/0310884 A1 | 12/2012 | Tennant | |
| 2012/0324069 A1 | 12/2012 | Nori et al. | |
| 2013/0031155 A1* | 1/2013 | Terrano | H04L 67/06 709/201 |
| 2013/0110828 A1* | 5/2013 | Meyerzon | G06F 16/24578 707/728 |
| 2013/0239228 A1 | 9/2013 | Cinarkaya et al. | |
| 2013/0290141 A1* | 10/2013 | Bhaskar | G06Q 30/0603 705/26.61 |
| 2014/0108474 A1 | 4/2014 | David et al. | |
| 2014/0164400 A1* | 6/2014 | Kruglick | G06F 16/9566 707/749 |
| 2014/0278640 A1* | 9/2014 | Galloway | G06Q 10/063114 705/7.15 |
| 2014/0324816 A1* | 10/2014 | Bennett | G06F 16/951 707/709 |
| 2014/0324817 A1* | 10/2014 | Diab | G06F 16/951 707/709 |
| 2015/0100547 A1 | 4/2015 | Holmes-Higgin et al. | |
| 2015/0101021 A1 | 4/2015 | McErlean et al. | |
| 2015/0121216 A1* | 4/2015 | Brown | G06N 3/008 715/707 |
| 2015/0154418 A1* | 6/2015 | Redberg | G06F 21/6218 713/165 |
| 2016/0104173 A1* | 4/2016 | Sharp | G06Q 30/0201 705/7.29 |
| 2016/0112362 A1* | 4/2016 | Perazzo | G06Q 10/063114 455/466 |
| 2016/0140146 A1* | 5/2016 | Wexler | G06F 16/5846 707/741 |
| 2016/0147471 A1* | 5/2016 | O'Hare | G06F 3/067 713/171 |
| 2016/0226731 A1* | 8/2016 | Maroulis | H04L 43/065 |
| 2016/0292193 A1* | 10/2016 | Madanapalli | G06F 21/6218 |
| 2017/0251041 A1* | 8/2017 | Elsner | H04L 65/4084 |

OTHER PUBLICATIONS

"Developing an Effective Search Strategy for Office 365 and Hybrid Deployments", Published on: Mar. 11, 2014 Available at: http://www.slideshare.net/Netwoven/office-365-hybrid-search-strategy-webinar-presentation.

Donston-Miller, Deb, "Microsoft Puts SharePoint in Context—in the Cloud and On Premises", Published on: Feb. 2, 2015 Available at: http://sharepointpromag.com/sharepoint/microsoft-puts-sharepoint-context-cloud-and-premises.

"Understanding On-Premises, Cloud, and Hybrid Environments in SharePoint 2013 & Office 365", Published on: Mar. 16, 2015 Available at: http://blog.epcgroup.net/on-premises-cloud-hybrid-in-sharepoint-2013-office-365.

"Best Practices for Hybrid Search Deployments", Retrieved on: Apr. 10, 2015 Available at: video.ch9.ms/sessions/spc/2014/SPC306_Groom.pptx.

"SharePoint 2013 and Office 365—Hybrid Scenarios", Retrieved on: Apr. 10, 2015 Available at: summit.office.com/resources/download/898.

"Configure Hybrid Search for SharePoint Server 2013", Published on: Jun. 13, 2014 Available at: https://technet.microsoft.com/en-us/library/dn197172.aspx.

"Hybrid Search Deep-dive: SharePoint Server 2013 & Office 365 Integration", Published on: Mar. 12, 2015 Available at: http://blog.epcgroup.net/hybrid-search-sharepoint-server-2013-office-365-integration.

"Splunk® Cloud™", Retrieved on: Apr. 10, 2015 Available at: https://www.splunk.com/content/dam/splunk2/pdfs/data-sheets/splunk-cloud-data-sheet.pdf.

International Preliminary Report on Patentability for International Patent Application No. PCT/US2016/029912, dated Jun. 20, 2017, date of filing: Apr. 29, 2016, 9 pages.

International Search Report and Written Opinion for International Patent Application No. PCT/US2016/029912, dated Jul. 27, 2016, date of filing: Apr. 29, 2016, 13 pages.

Second Written Opinion for International Patent Application No. PCT/US2016/029912, dated Mar. 21, 2017, date of filing: Apr. 29, 2016, 8 pages.

* cited by examiner

HYBRID SEARCH CONNECTOR

CROSS-REFERENCE TO RELATED APPLICATION

The present application is based on and claims the benefit of U.S. provisional patent application Ser. No. 62/155,749, filed May 1, 2015, the content of which is hereby incorporated by reference in its entirety.

BACKGROUND

Computing systems are currently in wide use. Many organizations employ both local and remote computing systems. A local computing system is one that is generally located at a location of the users of the computing system. A remote computing system is one that is remotely located, relative to the users, such as in a cloud-based architecture.

Some organizations use both local and remote computing systems. For instance, some organization may have an on-premise system where some data sources reside (such as file sharing systems, document management systems, etc.) and a cloud-based system where other content sources reside.

Users of such computer systems often attempt to find content on the computer systems. In doing so, they generate searches, in search systems, that search for relevant content, based on a search input. Searching for content in systems that use both local and remote computing system sources can be cumbersome, and difficult.

The discussion above is merely provided for general background information and is not intended to be used as an aid in determining the scope of the claimed subject matter.

SUMMARY

Documents in a local computing system are parsed for indexing and sent to a cloud-based computing system. The cloud-based search service indexes documents that are parsed on the local computing system, as well as documents that reside in the cloud-based computing system. When a user launches a search, the search is executed against a single search index in the cloud-based computing system, which includes an index of content sources from both the local computing system and the cloud-based computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
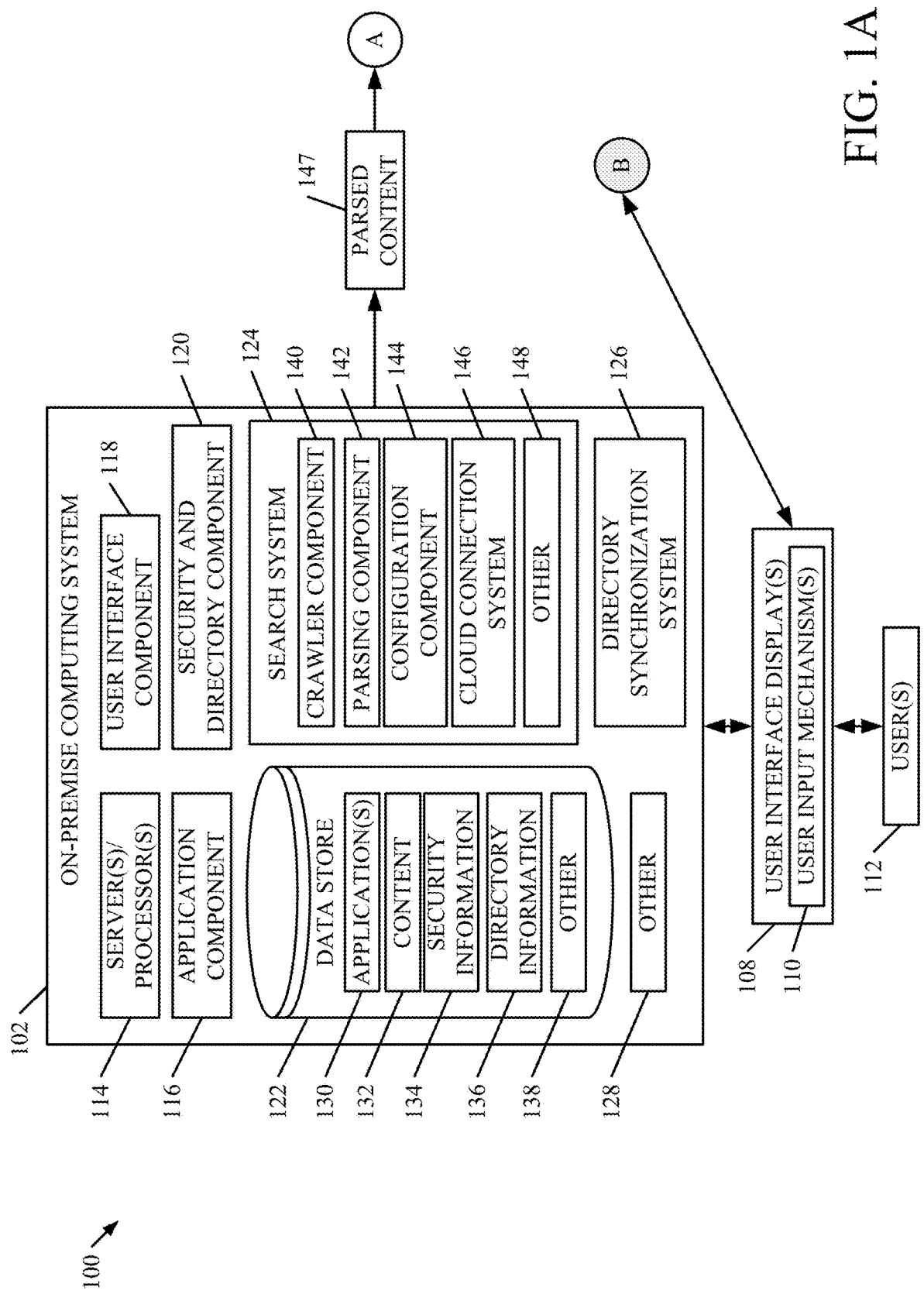
FIGS. 1A and 1B (collectively referred to as FIG. 1) show a block diagram of one example of a hybrid search architecture.
Figure 1B:
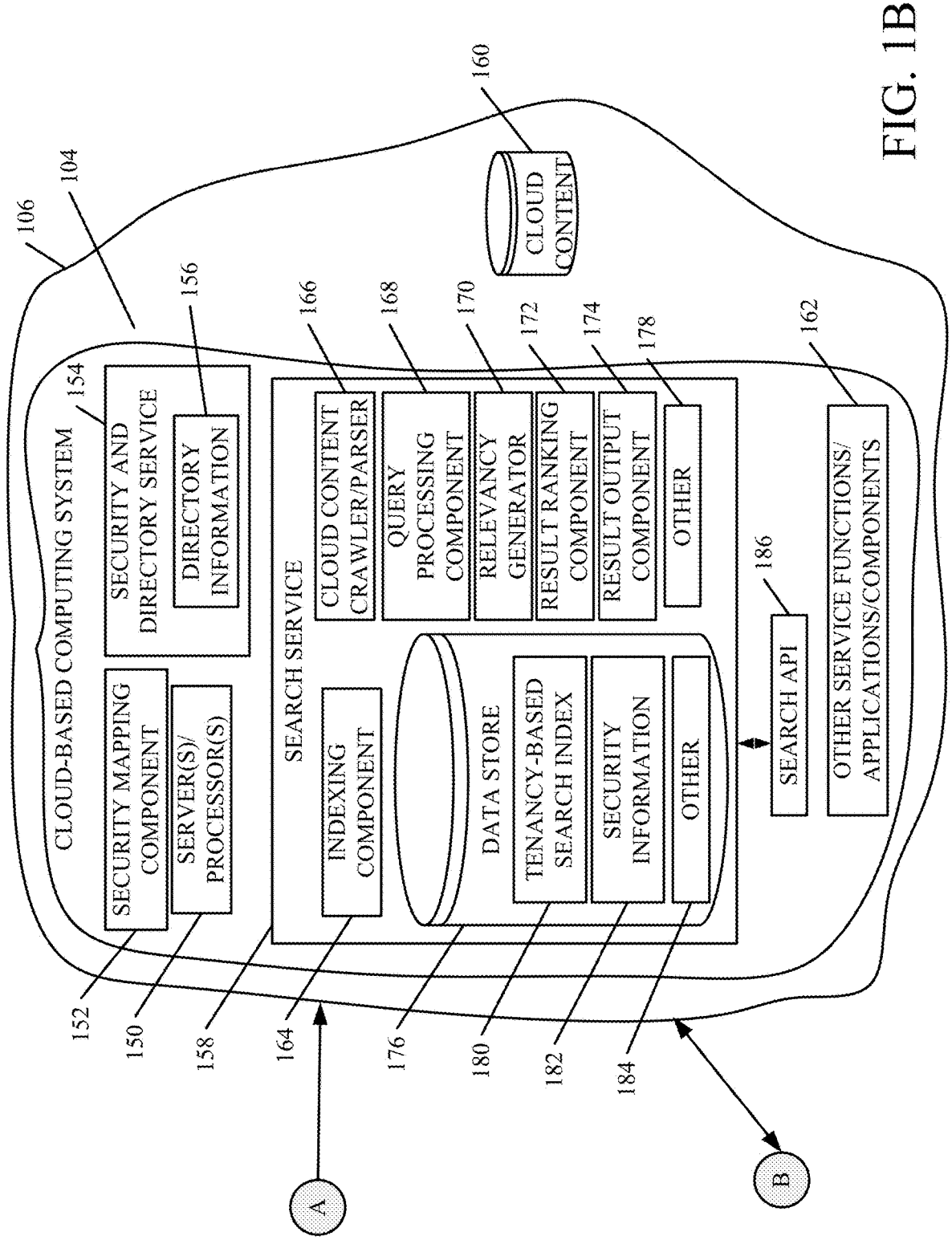

FIGS. 1A and 1B (collectively referred to as FIG. 1) show a block diagram of one example of a hybrid search architecture 100. Search architecture 100 illustratively includes on-premise computing system 102 and cloud-based computing system 104 that is located in cloud 106. Computing systems 102 and 104 can illustratively generate user interface displays 108 with user input mechanisms 110 for interaction by one or more users 112. In the examples described herein, users 112 can be administrative users or end users, or other users. Users 112 illustratively interact with user input mechanisms 110 to control and manipulate on-premise computing system 102 and cloud-based computing system 104.

In the example shown in FIG. 1, on-premise computing system 102 includes servers or processors 114, application component 116, user interface component 118, security and directory component 120, data store 122, search system 124, directory synchronization system 126, and it can include other items 128. Data store 122, itself, illustratively includes applications 130, content 132, security information 134, directory information 136, and it can include a wide variety of other information 138. Search system 124 illustratively includes crawler component 140, parsing component 142, crawler configuration component 144, cloud connection system 146, and it can include a variety of other items 148.

Cloud-based computing system 104 illustratively includes processors or servers 150, security mapping component 152, security and directory service 154 which, itself, can include directory information 156. System 104 also illustratively includes search service 158, cloud content 160, and a variety of other service functions, applications, components, etc., as indicated by block 162. In the example shown in FIG. 1, search service 158 illustratively includes indexing component 164, cloud content crawler/parser 166, query processing component 168, relevancy generator 170, result ranking component 172, result output component 174, data store 176, and it can include other items 178. Data store 176 illustratively includes a tenancy-based search index 180, security information 182, and it can include other items 184. Search service 158 also illustratively exposes a search application programming interface (or API) 186. Before describing the overall operation of architecture 100, an overview of some of the items in architecture 100, and their operation, will first be provided.

Application component 116 illustratively runs applications 130 in on-premise computing system 102. The applications can be a wide variety of different applications, such as electronic mail applications, scheduling and meeting applications, document sharing applications, document management systems, among a wide variety of others. When users 112 access content 132 through any of the applications 130, security and directory component 120 enforces security permissions reflected in security information 134. Therefore, only users that have a right to access certain content, are able to access that content.

In on-premise computing system 102, search system 124 not only enables user 112 to search for content, but it also generates information corresponding to content 132 in data store 122, and provides that to search service 158, where it is indexed and stored in tenancy-based search index 180. It also provides security information 134, corresponding to that content (such as access control list information or other permissions or security information). Security mapping component 152 maps the security information from the users of on-premise computing system 102 (stored in directory information 136) to the same users of cloud-based computing system 104, stored in directory information 156. Before any indexing commences, however, directory synchronization system 126 synchronizes the directory information 136 with directory information 156 so that security permissions can be mapped between the two systems. Therefore, security and directory service 154 can use the security information sent by on-premise computing system 102 to enforce security permissions relative to content that is indexed on search service 158.

Crawler configuration component 144 generates user interface displays with user input mechanisms that allow users 112 (such as administrators) to configure crawler component 140 to crawl certain data or content sources in data store 122. With respect to the present discussion, it will be assumed that crawler component 140 crawls content 132. When crawler component 140 finds new content that needs to be indexed, parsing component 142 parses the content into information that is to be used in indexing, and cloud connection system 146 sends the parsed content 147, to search service 158 in cloud-based computing system 104.

Search service 158 exposes search API 186. It is illustratively a source-independent API so that parsed content 147 can be provided according to a schema expected by search API 186, regardless of the source of the content. In this way, substantially any source can be indexed by search service 158, as long as the parsing component 142 parses content to be indexed according to the expected schema.

The parsed content 147 is received through API 186 by indexing component 164. Indexing component indexes the parsed content 147 and places it in tenancy-based search index 180, where it can be used to service search requests by users 112. Security mapping component 152 maps the security information corresponding to the document that is represented by parsed content 147, and includes that security information 182 in data store 176.

Cloud content crawler/parser 166 can also illustratively crawl cloud content 160 to identify content that needs to be indexed. It can parse that content and provide the parsed content reflecting the cloud content 160 to indexing component 164, which indexes it along with the parsed content 147 from on-premise computing system 102, in tenancy-based search index 180. Tenancy-based search index 180 thus includes an index of all of the desired content from on-premise computing system 102 and cloud-based computing system 104 that is searchable.

Query processing component 168 allows user 112 to submit a search query. In addition, users 112 can submit search queries through cloud connection system 146 in on-premise search system 124. In either case, query processing component 168 parses the query and launches a search against tenancy-based search index 180. It finds matching results that have a relevancy calculated for them by relevancy generator 170. Result ranking component 172 ranks the results based upon relevancy to the search input, or based on any of a wide variety of other ranking criteria. Result output component 174 outputs a representation of the search results, in rank order, in an integrated form. That is, the results are ranked based on relevancy (or other ranking criteria) in the same way, regardless of whether they are from cloud content 160 or content 132 from on-premise computing system 102. It outputs the integrated results, in rank order, to users 112, through user interface display 108.

Figure 2A:
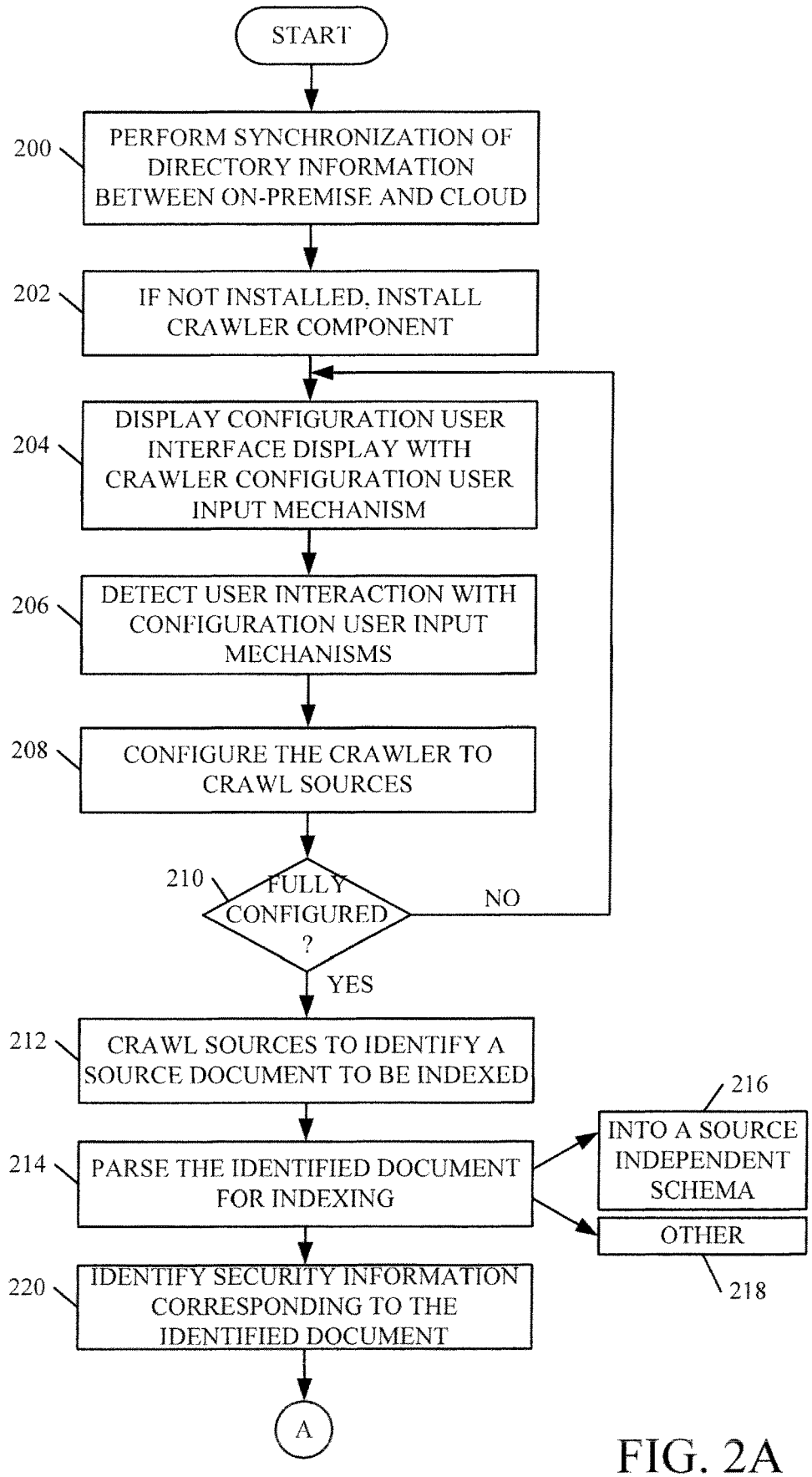
FIGS. 2A and 2B (collectively referred to as FIG. 2) show a flow diagram illustrating one example of the operation of the architecture shown in FIG. 1 in indexing content sources.
Figure 2B:
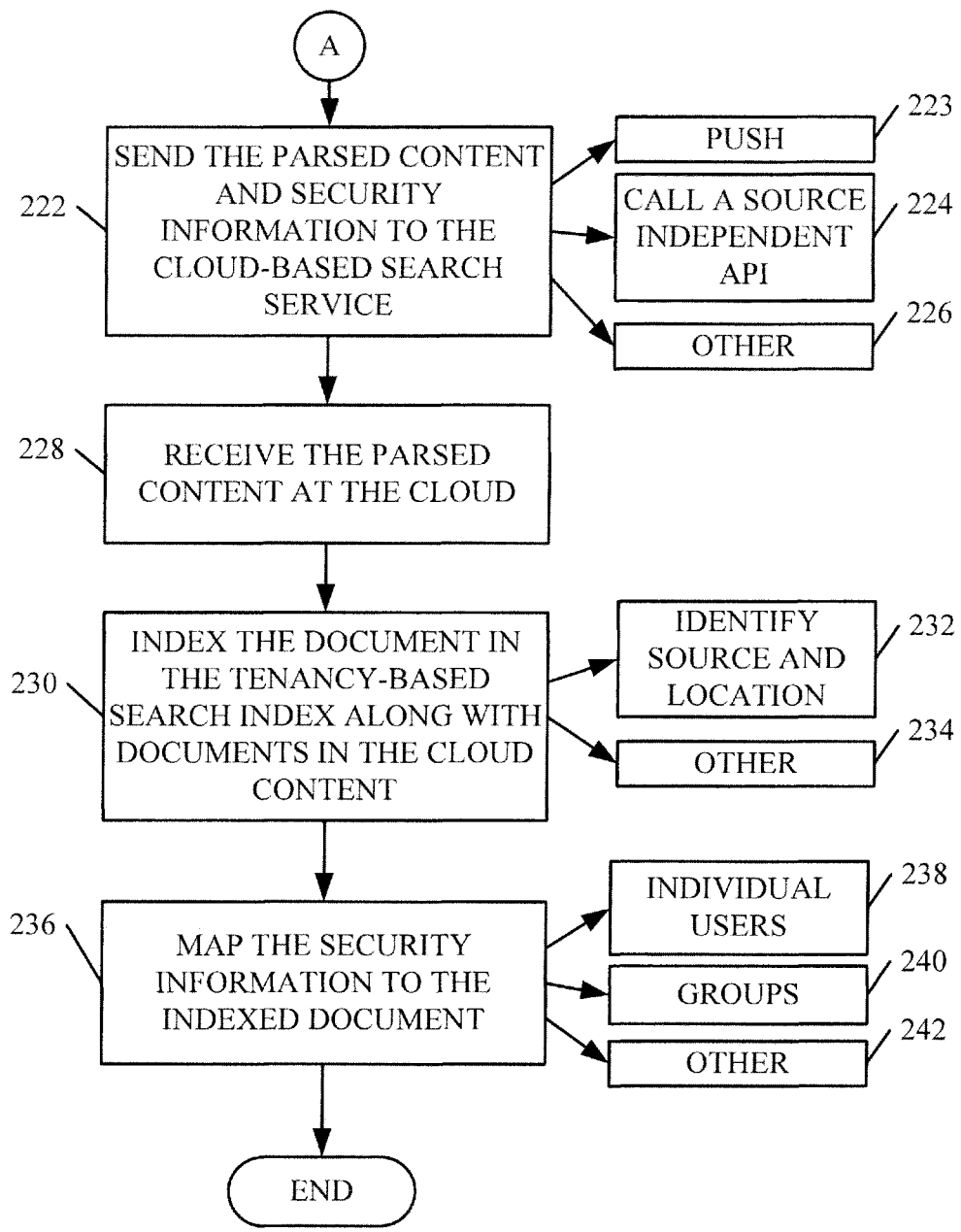

FIGS. 2A and 2B (collectively referred to as FIG. 2) show one example of a flow diagram that illustrates the operation of search architecture 100 in generating tenancy-based search index 180. FIGS. 1 and 2 will now be described in conjunction with one another.

Directory synchronization system 126 first performs synchronization of the directory information 136 in on-premise computing system 102 with directory information 156 in cloud-based computing system 104. This is indicated by block 200 in FIG. 2.

Next, if the crawler component 140 (or any other items in search system 124) is not installed in on-premise system 102, it is installed. This is indicated by block 202. Crawler configuration component 144 then displays a configuration user interface display with crawler configuration user input mechanisms that can be actuated by an administrative user 112 to configure crawler component 140. This is indicated by block 204. In one example, the configuration inputs allow the administrator to point crawler component 140 at various items or categories of content in data store 122 that are to be crawled and indexed in tenancy-based search index 180.

Crawler configuration component 144 then detects user interaction with the configuration user input mechanisms and configures the crawler to crawl sources, based upon the detected interactions. This is indicated by blocks 206 and 208 in FIG. 2.

If the crawler is not fully configured, then the process reverts to block 204. This is indicated by block 210.

Once the crawler is fully configured, it begins to crawl sources of data in data store 122 to identify a source document that needs to be indexed. In one example, it illustratively crawls content 132 and identifies documents or other content that need to be parsed and indexed in index 180. This is indicated by block 212.

Parsing component 142 then parses the identified document for indexing. This is indicated by block 214. In doing so, it can parse the document into a source-independent form, according to a source-independent schema. This is indicated by block 216. It can parse the document in other ways as well, as indicated by block 218.

Cloud connection system 146 then identifies security information 134 corresponding to the identified document. This is indicated by block 220. By way of example, it can identify access control list information corresponding to the identified document that is being parsed.

Cloud connection system 146 then sends the parsed content and security information to the cloud-based search service 158. This is indicated by block 222 in FIG. 2. It can do this, for instance, according to a push model in which the information is intermittently pushed to cloud 106. This is indicated by block 224. It can also do this by calling a source-independent API (such as API 186) exposed by search service 158. This is indicated by block 224. It can send the parsed content and security information in other ways as well, and this is indicated by block 226.

Indexing component 164 in cloud-based search service 158 receives the parsed content and security information 147. This is indicated by block 228. Index component 164 then indexes the document and places an index entry in tenancy-based search index 180. Recall that indexing component 164 is also indexing information from cloud content 160 and placing entries corresponding to that content in index 180 as well. This is indicated by block 230 in FIG. 2.

In doing so, it can illustratively identify the source and location of the content. For instance, it can identify a data source in on-premise computing system 102 and it can identify that the source resides in on-premise system 102. Alternatively, it can identify the source and location as being in cloud-based computing system 104. Identifying the source and location of the data in the index is indicated by block 232. It can index the document in other ways as well, and this is indicated by block 234.

Security mapping component 152 then maps the corresponding security information to the indexed document. This is indicated by block 236. For instance, it can map security permissions for individual users, as indicated by block 238. It can map security permissions for groups, as indicated by block 240. It can map security information in other ways as well, and this is indicated by block 242.

It will be appreciated that the index generation operations can be intermittently, or continuously, performed. In this way, the cloud-based index 180 will be frequently updated so that it contains an index of all information in both on-premise system 102 and the cloud-based computing system 104.

Figure 3:
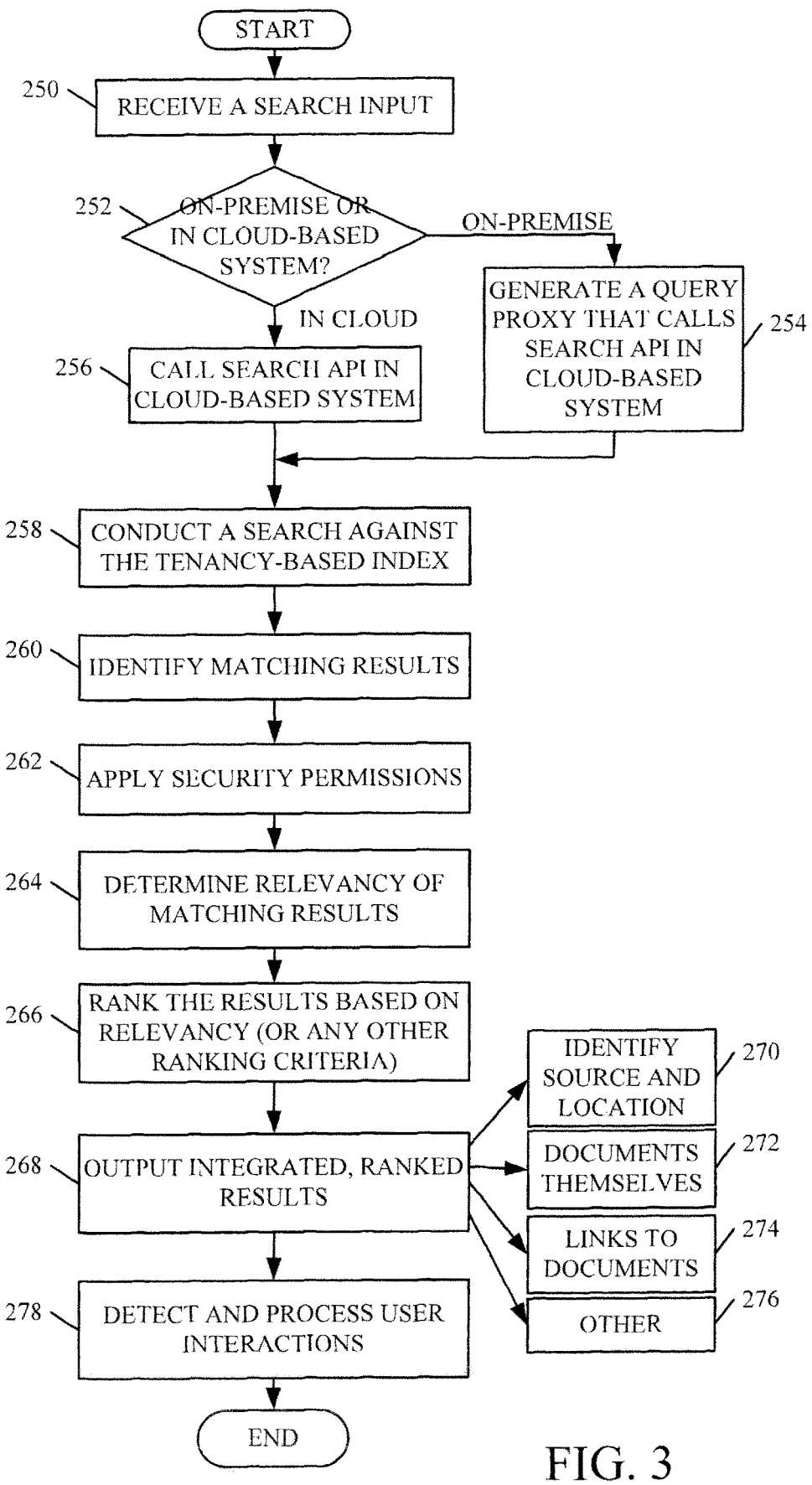
FIG. 3 is a flow diagram illustrating one example of the operation of the architecture shown in FIG. 1 in performing a search operation.

Once an index is generated, search service 158 can illustratively service search inputs (or search requests) from users 112. FIG. 3 is a flow diagram illustrating one example of the operation of architecture 100 in servicing search requests. Either search system 124, or search service 158, first receives a search request from user 112. This is indicated by block 150 in FIG. 3. Of course, the search input can be a keyword query, a natural language query, a pre-defined query, or a variety of other search inputs.

If user 112 is submitting the search query through the search system 124 in on-premise computing system 102, then system 124 generates a query proxy that calls the search API 186 on search service 158. This is indicated by blocks 252 and 254 in FIG. 3. However, if the user is submitting the search query directly to the cloud-based computing system 104, then user 112 is directly submitting the search query through API 186. This is indicated by block 256.

Query processing component 168 processes the query and conducts a search against the tenancy-based index 180, to identify relevant search results. This is indicated by blocks 258 and 260 in FIG. 3. Before returning the results to the user, security and directory service 154 applies the security information 182 corresponding to the identified search results. This is indicated by block 262. Thus, some of the search results may be removed based on those security permissions.

Of the remaining results, relevancy generator 170 generates a relevancy metric indicative of the relevancy of the results to the search input. This is indicated by block 264. Result ranking component 172 then ranks the results based upon relevancy (or any other ranking criteria). This is indicated by block 266.

Result output component 174 then outputs an integrated set of ranked results. For instance, it may output the top N results, regardless of where they are located (e.g., in on-premise computing system 102 or cloud-based computing system 104). Outputting the integrated, ranked results is indicated by block 268. The results may include an identifier (such as a visual indicator on the search results displayed) identifying the source and location of the result. This is indicated by block 270. The results may provide the documents, themselves, as the results. This is indicated by block 272. The results may be represented as links to the underlying documents, as indicated by block 274, or in a wide variety of other ways, as indicated by block 276.

Where the results are provided as links, the user may actuate one of the links and be navigated to the underlying document. The user may provide other inputs, and search system 158 can detect and process those user interactions as well, and this is indicted by block 278.

It can thus be seen that the present system advantageously provides a crawler in the on-premise computing system 102, and parsing is also performed in the on-premise system 102. Thus, no direct content is sent to the cloud computing system, from the on-premise system. This allows customer data location and on-premise security policies to be respected. In addition, security mappings are made between the on-premise system and the cloud-based system so that the security policies are further enhanced in this way.

Crawler component 140 can be used with a wide variety of different sources, or different connectors. This enables the system to be adapted to new sources of information or new computing systems where content may desirably be indexed on the cloud-based system. Further, because the present system provides parsed content only to the cloud-based system, the entire document (or other item of content) need not be provided to the cloud-based system for indexing. This reduces the amount of information that needs to be sent to the cloud, thus reducing network traffic and the computing and memory overhead needed for such transmissions.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
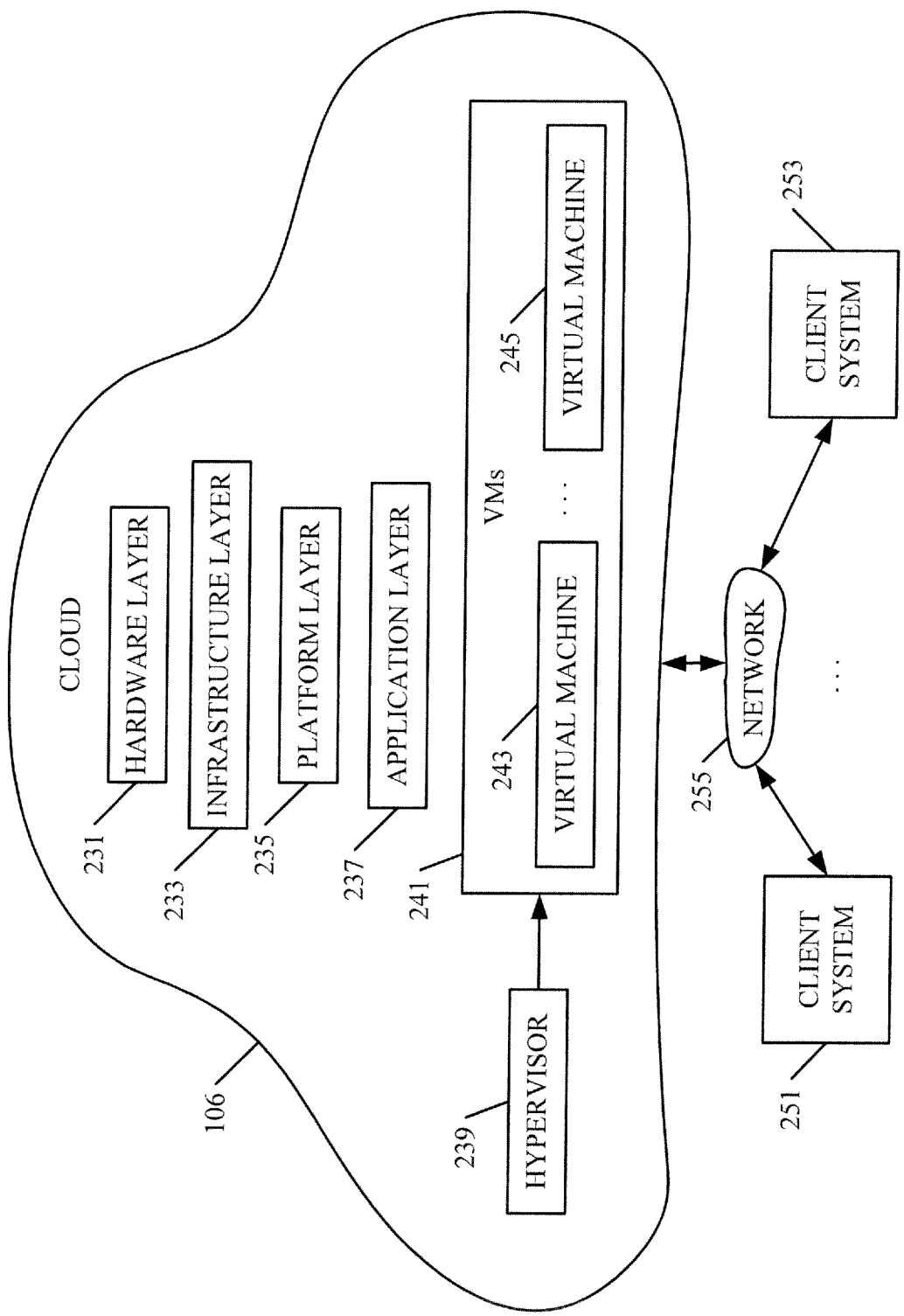
FIG. 4 is a block diagram of one example of other aspects of the cloud computing architecture.

FIG. 4 shows some other aspects of a cloud computing architecture. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

FIG. 4 is a block diagram that describes other aspects of cloud 106, in more detail. It can be seen in FIG. 4 that cloud 106 (or each of the different premises on cloud 106) can include a hardware layer 231, an infrastructure layer 233, a platform layer 235, and an application layer 237. A hypervisor 239 can illustratively manage or supervise a set of virtual machines 241 that can include a plurality of different, independent, virtual machines 243-245. Each virtual machine can illustratively be an isolated software container that has an operating system and an application inside it. It is illustratively decoupled from its host server by hypervisor 239. In addition hypervisor 239 can spin up additional virtual machines 241, or close virtual machines 241, based upon workload or other processing criteria.

A plurality of different client systems 251-253 (which can be end user systems or administrator systems, or both) can illustratively access cloud 106 over a network 255. Depending upon the type of service being used by each of the client systems 251-253, cloud 106 may provide different levels of service. In one example, the users of the different client systems are provided access to application software and databases. The cloud service then manages the infrastructure and platforms that run the application. This can be referred to as software as a service (or SaaS). The software providers operate application software in application layer 237 and end users access the software through the different client systems 251-253.

The cloud provider can also use platform layer 235 to provide a platform as a service (PaaS). This involves an operating system, programming language execution environment, database and webserver being provided to the client systems 251-253, as a service, from the cloud provider. Application developers then normally develop and run software applications on that cloud platform and the cloud provider manages the underlying hardware and infrastructure and software layers.

The cloud provider can also use infrastructure layer 235 to provide infrastructure as a service (IaaS). In such a service, physical or virtual machines and other resources are provided by the cloud provider, as a service. These resources are provided, on-demand, by the IaaS cloud provider, from large pools installed in data centers. In order to deploy applications, the cloud users that use IaaS install operating-system images and application software on the cloud infrastructure.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
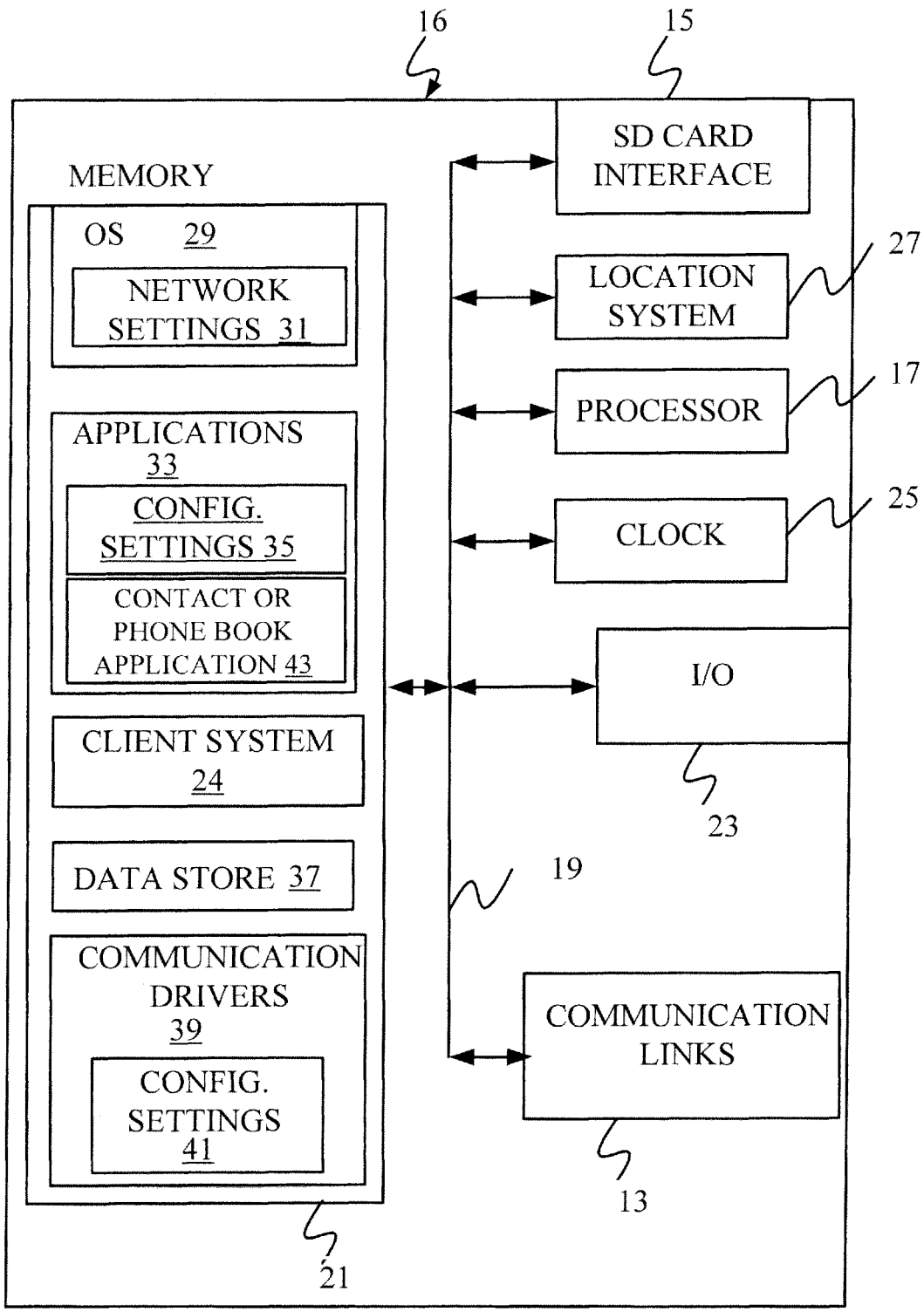
FIGS. 5-7 show examples of mobile devices that can be used in the architectures of any of the previous figures.
Figure 6:
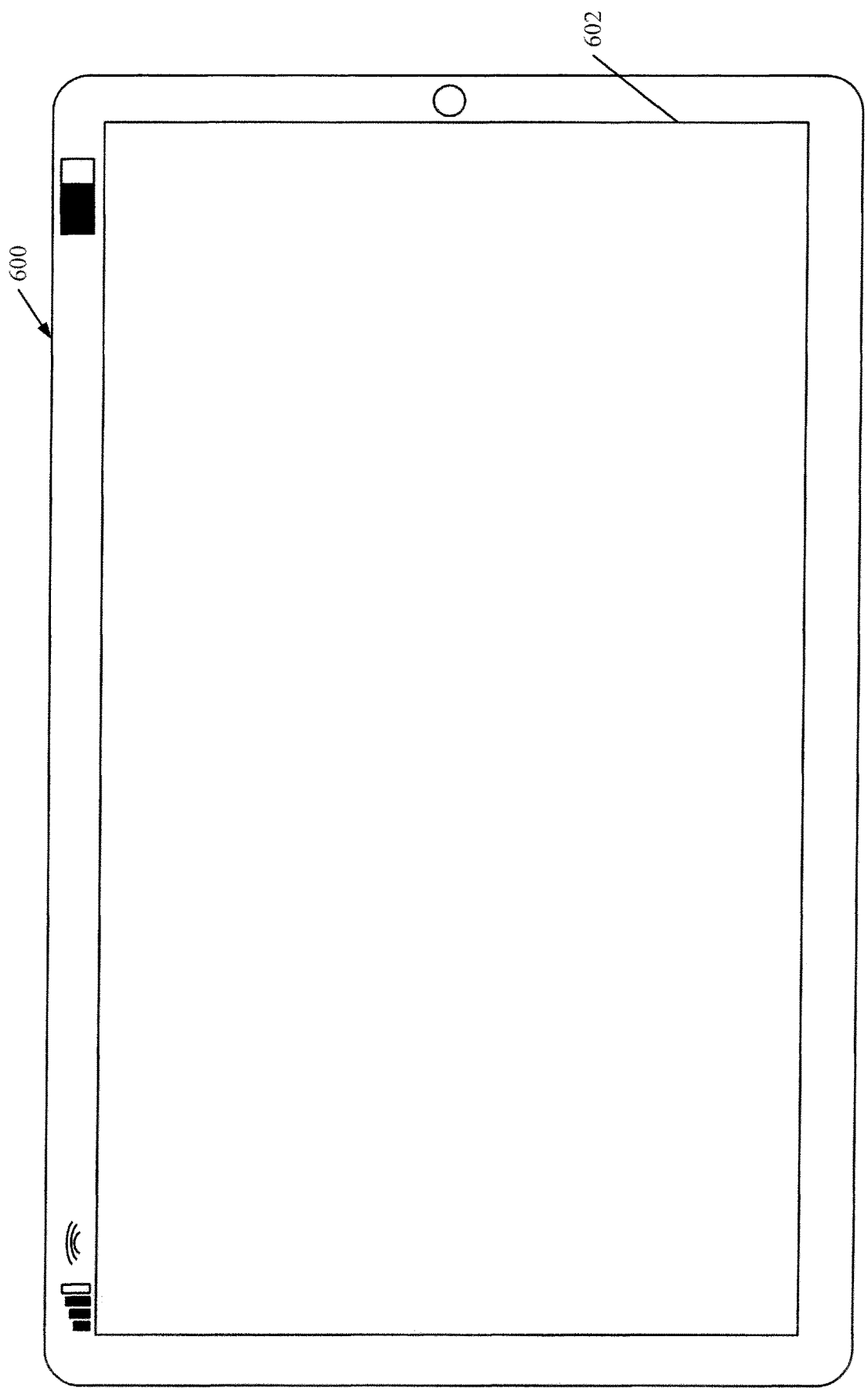
Figure 7:
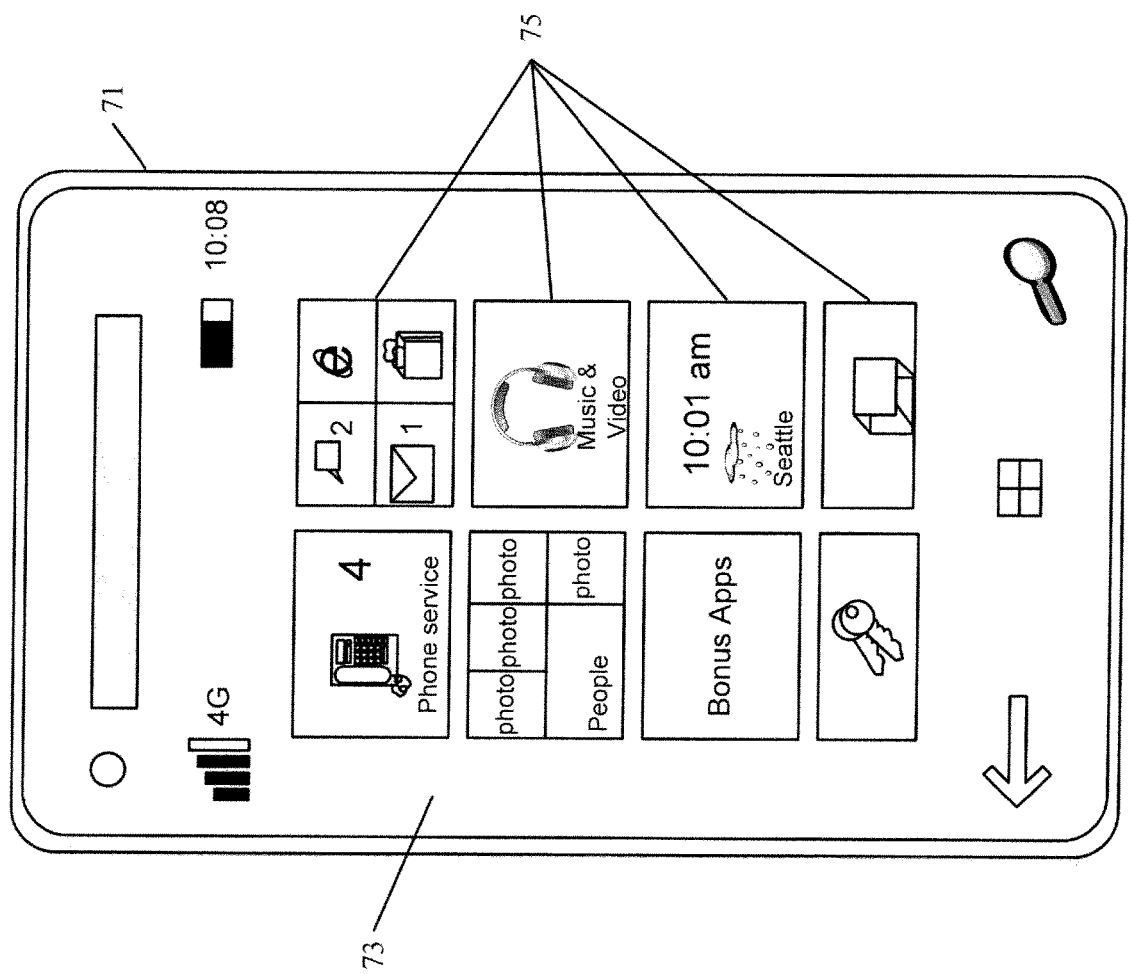

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 that can be used as well. The device can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some embodiments, the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. Although not shown, the PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
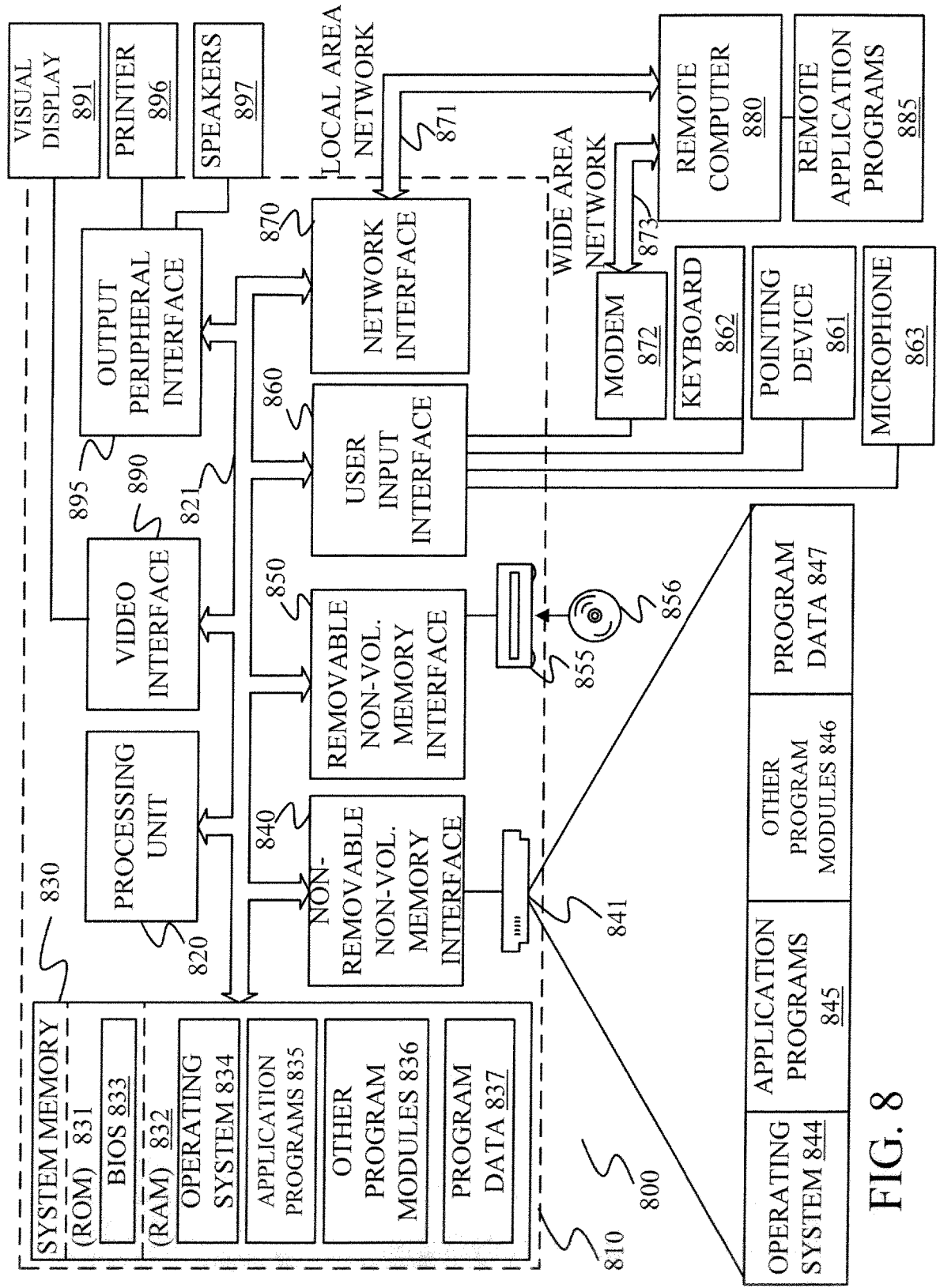
FIG. 8 is a block diagram of a computing environment that can be used in the architectures shown in any of the previous figures.

FIG. 8 is one example of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processors or servers from previous figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a tenancy-based search index that stores index entries indexing content for a given tenant in a multi-tenant system;

an indexing component in a cloud-based search system, that receives parsed content, indicative of a client-side document to be indexed, and indexes the client-side document in the tenancy-based search index based on the parsed content; and a cloud content parsing component that parses a cloud-based document for the given tenant to generate parsed content for the cloud-based document, the indexing component indexing the cloud-based document in the tenancy-based search index based on the parsed content for the cloud-based document.

Example 2 is the computing system of any or all previous examples and further comprising:

a security mapping component that maps security information from users of the given tenant to content indexed in the tenancy-based search index.

Example 3 is the computing system of any or all previous wherein the security mapping component maps the security information from groups in the given tenant to the content indexed in the tenancy-based search index.

Example 4 is the computing system of any or all previous and further comprising:

a query processing component that receives a search input and conducts a search against the tenancy-based search index based on the search input; and a result output component that outputs results indicative of both client-side documents and cloud-based documents that are responsive to the search input.

Example 5 is the computing system of any or all previous and further comprising:

a result ranking component that ranks the results based on a relevancy of each result, wherein the output component outputs the results in rank order, regardless of whether the results correspond to a cloud-based document or a client-side document.

Example 6 is the computing system of any or all previous and further comprising:

a security component that applies security information to the results before the results are output by the output component.

Example 7 is the computing system of any or all previous wherein the indexing component exposes a source-independent application programming interface (API) and receives the parsed content through the source-independent API.

Example 8 is the computing system of any or all previous wherein the indexing component receives the parsed content through the source-independent API according to a source-independent schema.

Example 9 is a computing system, comprising:

a crawler component that intermittently accesses a client-side data store to identify client-side content;

a parsing component that parses the identified client-side content and generates parsed content, indicative of information for indexing the identified client-side content; and a cloud connection system that intermittently connects to a cloud-based search service in a cloud-based computing system and calls a source-independent application programming interface (API) to push the parsed content to the cloud-based search service.

Example 10 is the computing system of any or all previous and further comprising:

a security component that generates security information to control access to the client-side content.

Example 11 is the computing system of any or all previous wherein the cloud connection system pushes the security information to the cloud-based computing system.

Example 12 is the computing system of any or all previous and further comprising:

a search system that receives a search user input and calls a search application programming interface (API) exposed by the cloud-based search service sand receives integrated results that are integrated into a single ranked list of results, regardless of whether the results are indicative of client-side content or cloud-based content.

Example 13 is the computing system of any or all previous wherein the parsing component generates the parsed content according to a source-independent schema.

Example 14 is a computer implemented method, comprising:

storing index entries indexing content for a given tenant in a multi-tenant system, in a tenancy-based search index in a cloud computing system;

receiving parsed content, indicative of a client-side document to be indexed, at the cloud computing system;

indexing the client-side document in the tenancy-based search index based on the parsed content;

parsing a cloud-based document, in the cloud computing system, for the given tenant to generate parsed content for the cloud-based document; and indexing the cloud-based document in the tenancy-based search index based on the parsed content for the cloud-based document.

Example 15 is the computer implemented method of any or all previous and further comprising:

mapping security information from users of the given tenant to content indexed in the tenancy-based search index.

Example 16 is the computer implemented method of any or all previous wherein mapping comprises:

mapping the security information from groups in the given tenant to the content indexed in the tenancy-based search index.

Example 17 is the computer implemented method of any or all previous and further comprising:

receiving a search input at the cloud computing system;

conducting a search against the tenancy-based search index based on the search input; and outputting results indicative of both client-side documents and cloud-based documents that are responsive to the search input.

Example 18 is the computer implemented method of any or all previous and further comprising:

ranking the results based on a relevancy of each result, wherein outputting results comprises outputting the results in rank order, regardless of whether the results correspond to a cloud-based document or a client-side document.

Example 19 is the computer implemented method of any or all previous and further comprising:

applying security information to the results before outputting the results.

Example 20 is the computer implemented method of any or all previous wherein receiving parsed content comprises:

exposing a source-independent application programming interface (API); and receiving the parsed content through the source-independent API according to a source-independent schema.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A cloud computing system, comprising:
a network interface configured to communicate with a client computing system that is remote from the cloud computing system over a wide area network;
at least one processor; and
memory storing instructions executable by the at least one processor, wherein the instructions, when executed, configure the cloud computing system to provide:
a search index configured to store index entries indexing content;
an indexing component configured to:
receive, from the client computing system, first parsed content indicative of parsing performed by the client computing system on a set of client-side documents stored on the client computing system;
obtain client storage location information that identifies a storage location of the set of client-side documents on the client computing system; and
index the set of client-side documents in the search index based on the first parsed content and the client storage location information; and
a cloud content parsing component configured to:
parse a set of cloud-based documents that are associated with the client computing system and stored in a cloud data store, to generate second parsed content for the set of cloud-based documents,
wherein the indexing component is configured to index the set of cloud-based documents in the search index based on the second parsed content;
a query processing component configured to:
receive a search input; and conduct a search against the search index to identify, based on the search input, search results that include at least one of the client-side documents and at least one of the cloud-based documents; and a search result output component configured to:
generate a search result output that includes:
a first user actuatable link that represents the at least one client-side document and is actuatable to access the storage location of the at least one client-side document on the client computing system; and
a second user actuatable link that represents the at least one cloud-based document and is actuatable to access a storage location of the at least one cloud-based documents in the cloud data store.

2. The cloud computing system of claim 1 wherein the instructions configure the cloud computing system to provide:
a security mapping component configured to map security information associated with one or more users to content indexed in the search index.

3. The cloud computing system of claim 2 wherein the search index comprises a tenancy-based search index that indexes content for a given tenant in a multi-tenant system, and the security mapping component is configured to map the security information from groups in the given tenant to the content indexed in the tenancy-based search index.

4. The cloud computing system of claim 2 wherein the security mapping component is configured to:
receive, from the client computing system, the security information defining user access permissions to the set of client-side documents; and
map the security information to the set of client-side documents; and
the search result output component is configured to:
apply the user access permissions to the at least one client-side document; and
output the search result output based on the application of the user access permissions.

5. The cloud computing system of claim 1, wherein the instructions configure the cloud computing system to provide:
a search result ranking component configured to rank the search results based on a relevancy of each search result,
wherein the search output component configured to output the search results in rank order, regardless of whether the search results correspond to a cloud-based document or a client-side document.

6. The cloud computing system of claim 5, wherein the instructions configure the cloud computing system to provide:
a security component configured to apply security information to the search results before the search results are output by the search result output component.

7. The cloud computing system of claim 1 wherein the indexing component exposes a source-independent application programming interface (API) and receives the first parsed content through the source-independent API.

8. The cloud computing system of claim 7 wherein the indexing component is configured to receive the first parsed content through the source-independent API according to a source-independent schema.

9. A client computing system, comprising: at least one processor; and memory storing instructions executable by the at least one processor, wherein the instructions, when executed, configure the client computing system to provide:
a crawler component configured to intermittently access a client-side data store, on the client computing system, to identify a client-side document; a parsing component configured to: parse the identified client-side document;
and generate parsed content, indicative of information for indexing the identified client-side document;
and a cloud connection system configured to:
intermittently connect to a cloud-based search service in a cloud-based computing system, that is remote from the client computing system over a communication network, and call a source-independent application programming interface (API) to send, to the cloud-based search service: the parsed content, and client storage location information that identifies a storage location of the client-side document in the client-side data store;
a search system configured to:
receive a search user input;
send a search request, based on the search user input, through a search application programming interface (API) exposed by the cloud-based search service;
and receive from the cloud-based search service through the search API, a search result based on an index on the cloud-based search service that indexes the client-side document and at least one cloud-based document.

10. The client computing system of claim 9, wherein the instructions configure the computing system to provide:
a security component configured to generate security information to control access to the client-side document.

11. The client computing system of claim 10 wherein the cloud connection system is configured to push the security information to the cloud-based computing system.

12. The client computing system of claim 9, wherein the search results are integrated into a single ranked list of results, regardless of whether the results are indicative of client-side document or cloud-based document.

13. The client computing system of claim 9 wherein the parsing component is configured to generate the parsed content according to a source-independent schema, and wherein the search results include storage locations of the client-side document and cloud-based document.

14. A computer implemented method, comprising:
storing, in a search index in a cloud computing system, index entries that index content;
receiving, by the cloud computing system from a client device, first parsed content indicative of parsing performed by the client device on a client-side document to be indexed;
obtaining client storage location information that identifies a storage location of the client-side document on the client device;
indexing the client-side document in the search index based on the first parsed content and the client storage location information;
parsing a cloud-based document, in the cloud computing system, to generate second parsed content for the cloud-based document;
indexing the cloud-based document in the search index based on the second parsed content;
receiving, by the cloud computing system, a search input;
conducting, by the cloud computing system, a search against the search index to identify search results that include the client-side document and the cloud-based document as correlated to the search input; and generating a search result output that includes:

a first user actuatable link that represents the client-side document and is actuatable to access the storage location of the client-side document on the client device; and a second user actuatable link that represents the cloud-based document and is actuatable to access a storage location of the cloud-based document.

15. The computer implemented method of claim 14 and further comprising:

mapping security information associated with users to content indexed in the search index.

16. The computer implemented method of claim 15 wherein mapping comprises:

mapping the security information associated with groups to the content indexed in the search index.

17. The computer implemented method of claim 15 and further comprising:

receiving, from the client device, the security information defining a user access permission to the client-side document;

mapping the security information to the client-side document;

applying the user access permission to the at least one client-side document; and outputting the search result output based on the application of the user access permission.

18. The computer implemented method of claim 14 and further comprising:

ranking the search results based on a relevancy of each search result, wherein outputting search results comprises outputting the search results in rank order, regardless of whether the search results correspond to a cloud-based document or a client-side document.

19. The computer implemented method of claim 18 and further comprising:

applying security information to the search results before outputting the search results.

20. The computer implemented method of claim 14 wherein receiving parsed content comprises:

exposing a source-independent application programming interface (API); and receiving the parsed content through the source-independent API according to a source-independent schema.

* * * * *